United States Patent [19]
Bellus et al.

[11] Patent Number: 5,606,413
[45] Date of Patent: Feb. 25, 1997

[54] REAL TIME SPECTROSCOPIC IMAGING SYSTEM AND METHOD

[75] Inventors: Peter A. Bellus, Eden Prairie, Minn.; Terry L. McKinney, Severn, Md.

[73] Assignee: Northrop Grumman Corporation, Los Angeles, Calif.

[21] Appl. No.: 374,055

[22] Filed: Jan. 19, 1995

[51] Int. Cl.⁶ ............................. G01J 3/28; G01N 21/31; G01N 21/35
[52] U.S. Cl. ............... 356/326; 250/339.02; 356/308; 356/328
[58] Field of Search .................. 356/326, 300, 356/308, 328, 51, 402–411; 250/339.01, 339.02, 339.05–339.09, 339.11, 226, 253

[56] References Cited

U.S. PATENT DOCUMENTS

| | | | |
|---|---|---|---|
| 4,490,845 | 12/1984 | Steinbruegge | 250/339 X |
| 4,783,166 | 11/1988 | Stern | 356/402 X |
| 5,111,038 | 5/1992 | Taylor | 250/225 |
| 5,120,961 | 6/1992 | Levine | 250/339 |
| 5,149,959 | 9/1992 | Collins | 250/226 |
| 5,216,484 | 6/1993 | Chao | 356/326 |
| 5,379,065 | 1/1995 | Cutts | 348/269 |

*Primary Examiner*—Vincent P. McGraw
*Attorney, Agent, or Firm*—Philip A. Florenzo

[57] ABSTRACT

To dramatically reduce image data processing requirements in spectroscopic imaging systems, an optical filter is alternatingly tuned to a pair of selected passband wavelengths related to an absorption wavelength of a sample under test, such that only light of the two selected wavelengths received from the test sample are recorded as alternating image frames by a CCD optical detector. Successive pairs of consecutive image frames are computer processed, on a corresponding pixel-by-pixel basis, to generate a series of composite image frames that may be displayed in enhanced contrast to permit real time analysis of a sample characteristic of interest.

17 Claims, 2 Drawing Sheets

REAL TIME SPECTROSCOPIC IMAGING SYSTEM AND METHOD

FIELD OF THE INVENTION

The present invention relates to spectroscopic imaging and particularly to spectroscopic analysis of materials.

BACKGROUND OF THE INVENTION

Spectroscopic imaging is a topic that, of late, has received increased attention. A variety of factors have contributed to this recent surge in popularity, such as an increased appreciation and need for its application in, for example, materials analysis, the appearance of affordable array optical sensors, and the increased availability of economical computer power necessary to process the prodigious amount of data involved.

With regard to the computer power factor, consider the requirements for processing spectroscopic imaging data of a modestly high resolution scene over a relatively narrow bandwidth. A 576×384 CCD optical sensor array has 221,184 pixels. This is far fewer pixels than the typical IBM PC VGA 640×480 image format, and the high resolution CCD imagers are now commercially available with 4,000×4,000 pixels. Imaging over a typical wavelength band, for example, 400–800 nm, with modest resolution (10 nm), results in 40 data points per pixel. At 8 bits (1 byte) per data point, 8.8 megabytes of data per image frame is generated. At 30 frames per second for typical NTSC interlaced TV imagery, a computer is required to process (or at least store) 265 megabytes per second. A 30 second video clip then produces 8 gigabits of data. This is a prodigious data processing requirement for even modern PCs, and thus analysis of this volume of data in real time is simply an impossibility. Consequently, the only available choice is post (off-line) processing of the data.

Several techniques have been used in the past to, for example, map landscape for environmental purposes, such as plant species mapping, plant stress mapping, geological surveying, etc. The earliest and simplest technique was single point spectroradiometer measurements. This technique involves producing a map by conventional means, and then obtaining single point spectra at several map coordinates for analysis. Differences in absorption at different wavelengths could then be geographically related to the ground. Thus, for example, from a aerial photo of a stand of trees, a subsequent spectrum of a single point in the stand can be analyzed to confirm that the trees are spruce trees, and then an assumption can be made that the entire stand is spruce.

Imaging spectroradiometers can increase the spectral sample size to every pixel in the image. This is accomplished by using a high speed (high data rate) single point spectroradiometer to scan the scene to be imaged using an oscillating mirror. The imaging data, stored on computer tape, contains a complete spectrum of every pixel in the imaged scene, and only after off-line processing, can the data be remapped as an image of, for example, plant health color-coded on the map.

Earlier spectroradiometers used a limited number of wavelength bands over a spectral region of interest. This is because the least expensive and most readily available hardware was a filter wheel, which, in practical terms, is limited to the number of filters it can contain. Also, before very sensitive optical detectors were developed, more bandwidth per filter increased the image signal to noise ratio to an acceptable level. And finally, until more powerful computers were available, fewer filters meant less data per pixel, and thus a less burdensome volume of image data to process. Recent advances in imaging spectroradiometers involved the use of interferometers instead of filters. Interferometers provide a narrower bandwidth, that can be accommodated by fast detectors and computers capable of higher data rates. The inclusion of an interferometer adds expense and complexity to the system.

Other advances in spectroscopic imaging have employed programmable optical filters, such as acousto-optic tunable filters (AOTF) to select the light wavelength of interest, which is passed to a sensitive camera photodetector array. One example of using an AOTF optical filter as a wavelength selection device in imaging spectrophotometry is disclosed in U.S. Pat. No. 5,216,484, entitled REAL-TIME IMAGING SPECTROMETER. In the spectrometer of this patent, the AOTF is progressively tuned to scan a range of wavelengths, such as to produce a succession of camera image frames of a material or scene to be analyzed at a progression of different wavelengths. While the image frames are available for display in real time, the displayed images are difficult to interpret for analysis purposes.

SUMMARY OF THE INVENTION

An objective of the present invention is to provide an improved system and method for real-time spectroscopic analysis of materials.

A further objective of the present invention is to provide a spectroscopic system and method of the above-character, which requires minimal processing of image data.

Another objective of the present invention is to provide a spectroscopic system and method of the above-character, wherein readily interpretable images are produced in real time for analysis.

To achieve these objectives, the spectroscopic image system of the present invention comprises an optical filter tunable to at least first and second passband wavelengths having selected relationships to a light wavelength characteristic of a sample under test, input optics positioned to focus image light from the test sample to a plane image incident at an input face of the optical filter; a planar optical detector array positioned to receive the focused plane image at the first and second passband wavelengths emanating from an output face of the optical filter; and an image processor connected to the optical detector for processing image data representing test sample image light at the first and second wavelengths to generate a composite plane image permitting real time analysis of the test sample.

Further in accordance with the present invention, a method for performing spectroscopic analysis of a test sample is provided, which includes the steps of tuning an optical filter to a set of passband wavelengths that includes at least first and second passband wavelengths having selected relationships to a light wavelength characteristic of the test sample; focusing image light from the test sample passed by the optical fiber to a plane image; optically detecting the focused plane image to produce image data representing test sample light at the first and second wavelengths; and processing the image data to generate a composite plane image permitting analysis of the test sample in real time.

Additional features, advantages, and objectives of the present invention will be set forth in the description which follows and in part will be apparent from the description, or may be learned by practice of the invention. The objectives and advantages of the present invention will be realized and obtained by the system and method particularly pointed out in the following written description and the appended claims, as well as in the accompanying drawing.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate preferred embodiments of the invention and, together with the description, serve to explain the principles of the invention.

DETAILED DESCRIPTION OF THE PREFERRED EMBODIMENTS

Figure 1:
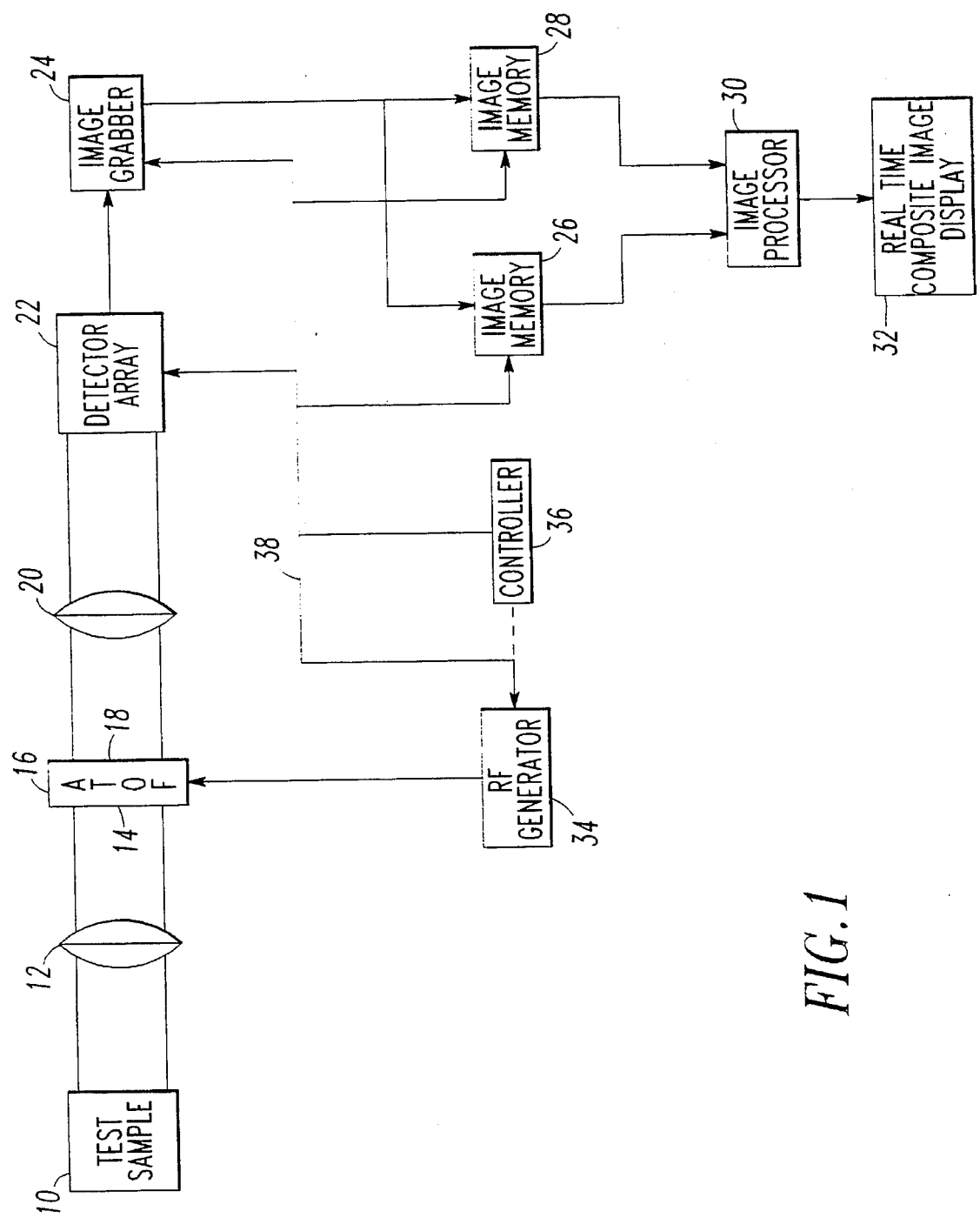
FIG. 1 is a circuit block diagram illustrating a presently preferred embodiment of a spectroscopic imaging system in accordance with the present invention.

The spectroscopic imaging system of the present invention is illustrated in FIG. 1 as applied to performing analysis of a test sample 10 for the presence of particular elements, physical characteristics, etc. The light reflected by the sample is focused by input optics 12 to a plane image of the sample incident on the input face 14 of a tunable optical filter 16, such as an acousto-optic tunable filter (AOTF). Image light of the test sample at the wavelength to which optical filter 16 is tuned emanates from the optical filter output face 18 and is focused by output optics 20 to a plane image incident on a planar optical detector array 22, which may take the form of a charge-coupled device (CCD) in a video camera.

The plane image stored by the detector array 22 may be read out as a succession of either image fields or image frames to an image grabber 24. If the detector array 22 is a conventional video camera CCD operating in NSTC format, the detector array is read out at a rate of 30 image frames per second; each image frame consisting of an interlaced pair of image fields. Thus, 60 image fields per second may be made available for readout. The image data of an interlaced pair of fields, successively seized by image grabber 24, are fed to separate image memories 26 and 28. From these memories, the image (pixel) data for each of the two fields are fed in parallel, on a corresponding pixel-by-pixel basis, to an image processor 30 functioning to process the pixel data to generate an image frame as a composite of the interlaced pair of image fields. The composite image frame is then displayed by display 32 in real time.

Rather than processing pixel data on an image field basis, processing can be performed on the basis of image frames. In this case, the detector array 22 is read out as a succession of image frames to image grabber 24. One image frame of each consecutive pair of image frames is read into image memory 26, while the other image frame of the consecutive pair is read into image memory 28. The corresponding pixel data of the two consecutive image frames are read out in parallel to image processor 30 for processing to generate a composite image frame for display by display 32 in real time.

In accordance with a feature of the present invention, optical filter 16 is tuned to a limited number of passband wavelengths preselected based on a priori knowledge. That is, at least two passband wavelengths are selected, based on the particular sample characteristic to be analyzed, that provide a highly discernible difference in the plane images of the sample focused on the detector array 20. Thus, for example, one of the two passband wavelengths selected may be a wavelength of light that is readily absorbed by sample 10 due to the presence of the sample characteristic of interest, while the other selected passband light wavelength may be a wavelength of light that is readily reflected (or transmitted when the test sample is back-illuminated) despite the presence of the sample characteristic of interest.

Still referring to FIG. 1, an RF generator 34 is connected to apply RF signals to optical filter 16 that are effective to tune the optical filter to the selected pair of passband wavelengths. In the system illustrated in FIG. 1, optical filter 16 is tuned to a series of passband wavelength sets, each set including the pair of selected passband wavelengths. Thus, the RF optical filter tuning signals are generated in alternation. A 36 controller is thus provided to generate timing pulses over a bus 38 to synchronize system operation. Specifically, controller 36 synchronizes the alternating generation of the two RF filter tuning signals to the image field or image frame rate (which ever is selected) of the detector array 22, such that optical filter 16 is tuned to one of the selected passband wavelengths as an image field (or image frame) of the light image passed by the filter is read out to the image grabber 24, and then the optical filter is tuned to the other selected passband wavelength as the next image field (or image frame) of the light image passed by the filter is read out to the image grabber. Controller 36 also synchronizes image grabber 24 to feed the first image field (or image frame), upon readout completion, to image memory 26 and then feed the next image field (or image frame) to image memory 28. These image memories are then synchronized to readout the image fields (or image frames) to the image processor in parallel, where the image data is processed, pixel-by-pixel, to generate a series of composite image frames for display by display 32. Alternation of the tuning of the optical filter to the selected passband wavelengths and the read out and processing of paired sets of image fields (or image frames) need only be repeated for a limited number of cycles to generate a sufficient number of successive composite image frames that permit reliable, real time analysis of the sample characteristic of interest. It will be appreciated that controller 36, image grabber 24, image memories 26, 28 and image processor 30 may all be embodied in a programmable digital computer.

As an example of the numerous applications to which the present invention may be applied, a spectroscopic imaging system, such as illustrated in FIG. 1, could be utilized to detect hydrocarbons based on their C-H stretching mode vibrational absorption of light at a wavelength of approximately 3.3 microns. Assume, for example, that sample 10 is a plastic part molded of an organic polymer, such as polyethylene, and quality control requirements call for mapping of the thickness of the part. To optimize test results, the plastic part is trans-illuminated with light concentrated in the 3–5 micron wavelength range. The optical filter 16 is then alternatingly tuned to the 3.3 micron passband wavelength and a 3.8 micron passband wavelength, a light wavelength that is not readily absorbed by the organic polymer part. Thus, image frames consisting of image light at a wavelength of 3.3 microns are taken in alternation with image frames consisting of image light at a wavelength of 3.8 microns. The thicker portions of the plastic part should absorb more 3.3 micron light than thinner portions of the part, whereas part thickness would have little difference in the amount of 3.8 micron light focused on detector array 22. Image processor 30 could then be programmed to mathematically ratio consecutive sets of image frames of 3.3 micron light and 3.8 micron light on a corresponding pixel-by-pixel basis to generate composite image frames that provide pixel maps, wherein lower pixel values represent thicker portions of the part that have a higher absorption of 3.3 micron light. An alternative processing approach would be to perform a subtraction operation with respect to corresponding pixel values in the 3.3 micron image frame and the 3.8 micron image frame and convert the pixel difference values to gray scale values that can be used to construct the composite image frames. Display of the resulting composite image frames would then provide gray-scale maps of the polymer part thickness.

The composite image frames displayed on display 32 may be visually inspected to determine if the organic polymer part meets manufacturing specifications. However, to facilitate visual inspection, the composite image frames may be further processed by applying pixel values of the composite image frames to threshold levels in order to generate a black and white image, rather than a gray-scale image where, wherein, for example, white would represent a part thickness above a critical minimum and black represent a part thickness below a critical minimum. The result would then be displayed as a black mask image highlighting unacceptably thin portions of the part that can be readily interpreted by an inspector in real time.

Rather than visual inspection of the composite images, inspection could be automated utilizing computer processing to perform a pixel-by-pixel comparison of the composite image frames to standard image frames of the part. Any discrepancies could then be flagged to identify parts that are of out-of-tolerance thicknesses and even parts that have other defects, such as voids.

Another example of an application for the spectroscopic imaging system of FIG. 1 would be to generate composite image frames that represent moisture maps of any test sample whose moisture content is the characteristic of interest. Thus, the sample may be a food item, such as a potato chip, a sheet of paper, a living plant, etc. The test sample is illuminated with near-IR radiation rich in the 1 to 2 micron wavelength range. Optical filter 16 is then alternately tuned, in synchronism with the frame rate of the detector array 22, to a passband wavelength of 1.92 microns, a wavelength of light to which water is highly absorptive, and a reference passband wavelength of 1.84 microns, a light wavelength to which water is highly reflective. Successive pairs of image frames are then processed in any of the various ways described above, to facilitate real time analysis of the moisture content of the sample.

Since commercially available acousto-optic tunable filters also have the capability of being concurrently tuned to the two different passband wavelengths, the present invention may be practiced in a way to take advantage of this capability. When optical filter 16 is simultaneously tuned to two different passband wavelengths by RF generator 34, the plane image focused on the detector array 22 would consist of image light at both of these passband wavelengths. The image light of each pixel of the detector array is then the sum of the image light at the two wavelengths. Consequently, sensitivity and dynamic range are increased. In the moisture mapping example given above, the optical filter 16 could be simultaneously tuned to 1.42 and 1.92 micron passband wavelengths. Light at a 1.92 micron wavelength has been used to determine moisture content of fairly dry samples by measuring the amount of absorption, whereas light at a 1.42 micron wavelength has been used to measure moisture content of moist samples. Thus, if the sample under test has a high moisture content, absorption of the 1.92 light wavelength is saturated, that is, all light at this wavelength is absorbed. There will, however, be sufficient 1.42 micron light reflected by the sample to provide meaningful measurements of moisture content. If the sample has a low moisture content, absorption of the 1.42 micron wavelength light will be minimal, but changes in absorption of the 1.92 wavelength light, which has a much higher extinction coefficient, still provide meaningful data for processing using the thresholding technique or the composite image frame to standard image frame comparison technique described above. Acousto-optic tunable filters are now commercially available that can be tuned simultaneously to as many as four different wavelengths of light, and it is envisioned that future AOTFs will be capable of passing even greater numbers of light wavelengths simultaneously. The availability of more than two wavelengths of light for image processing at the same time may offer advantages in certain analysis applications.

As an example exploiting this multiple tuning capability of an AOTF, consider the application to identifying street lamps in a scene as to whether they are low pressure mercury arc lamps or high pressure sodium lamps. While there is a color difference, light from these two types of lamps will appear essentially white, even in color photographs. High pressure sodium lamps have a single broad spectral emission at a wavelength of 589 nm. A low pressure mercury arc has two widely separated emission lines at wavelengths of 436 nm and 546 nm. By simultaneously tuning an AOTF to a passband set at the 436 nm and 546 nm wavelengths, twice the amount of light will be incident on detector ray 22 as compared to tuning the AOTF to the 436 nm and 546 nm wavelengths sequentially. The AOTF is then alternatingly tuned to the set of 436 nm and 546 nm passband wavelengths simultaneously and the single passband wavelength at 586 nm. Corresponding pixel values of an image frame at the wavelengths of 436 nm and 546 nm are subtracted from corresponding pixel values of an image frame consisting of image light at the 589 nm wavelength. The pixel values of a composite image frame will be zero for those pixel values that did not change in the two image frames, positive for those pixels that received light at the 589 nm wavelength from high pressure sodium lamps, and negative for those pixels that received light at the 436 nm and 546 nm wavelengths from low pressure mercury arc lamps. The composite image frame pixel values could then be normalized to produce a scene image with areas lighter than the background indicating locations of high pressure sodium lamps and areas darker than the background indicating locations of low pressure mercury arc lamps.

This exemplary application of the present invention illustrates that light emission wavelengths of test samples may be utilized as a basis for spectroscopic analysis. In addition, this example demonstrates that one of the alternating image frames may include sample light at more than one wavelength. It will be appreciated that both of the alternating image frames (fields) may include sample light at plural wavelengths.

Figure 2:
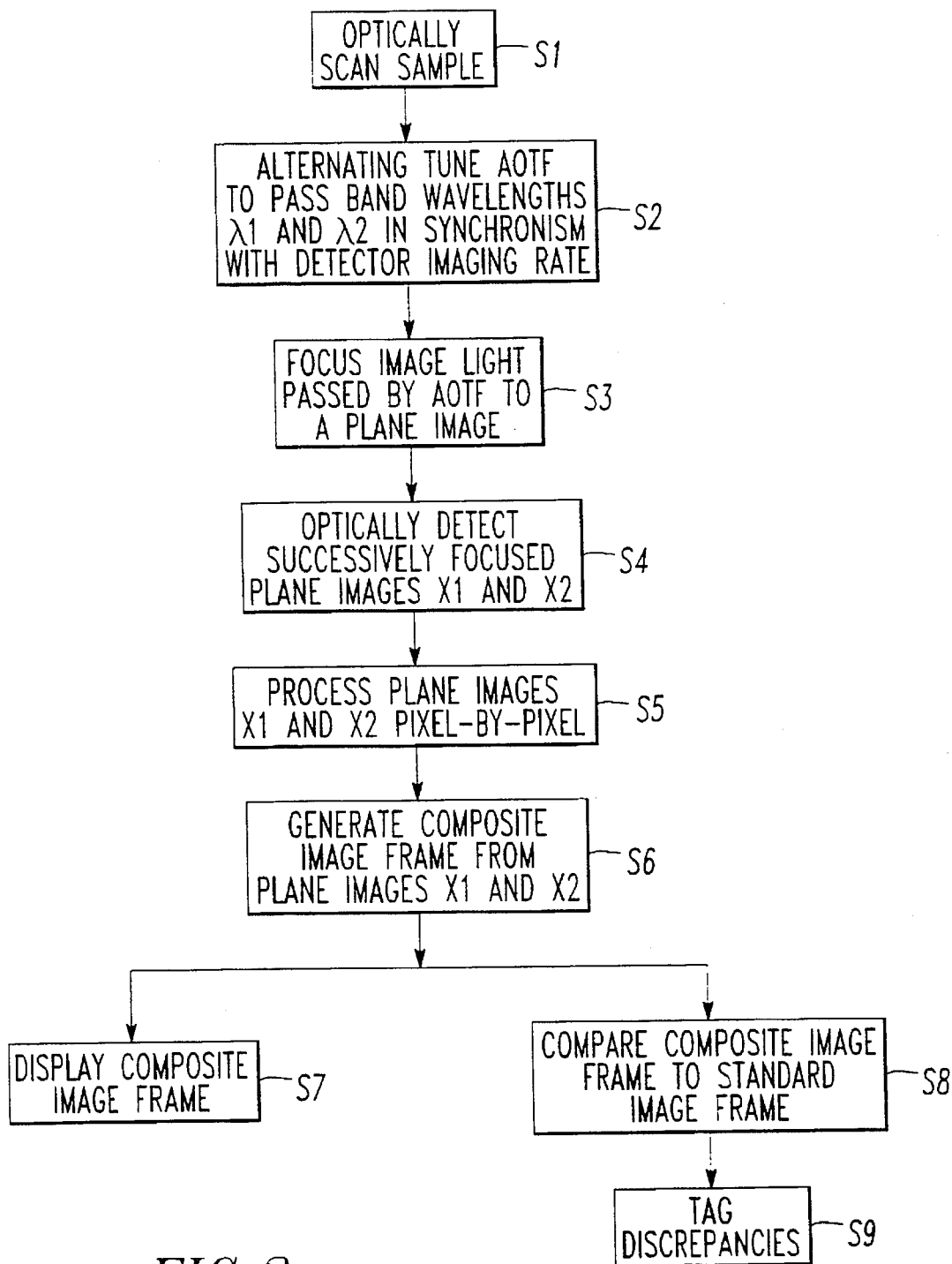
FIG. 2 is a flow chart illustrating a spectroscopic imaging method in accordance with a presently preferred embodiment of the present invention.

FIG. 2 provides a flow chart illustrating the basic steps performed by the system of FIG. 1 to practice the spectroscopic imaging method of the present invention. Thus, in step S1, a test sample is optically scanned to produce light image of the test sample. The optical filter (AOTF) 16 is alternately tuned to passband wavelengths λ1 and λ2 in synchronism with the imaging rate of the planar detector array 22 (step S2). The image light passed by the AOTF is focused to a plane image incident on the planar detector array 22 in step S3. Successively focused plane images X1 and X2 are optically detected by the detector array 22 in step S4. The detected plane images X1 and X2 are then processed, pixel-by-pixel, in step S5 to generate a composite image frame in step S6. The composite image frame may then be displayed for real time visual inspection in step S7. Alternatively, the composite image frame may be compared against a standard image frame in step S8, and any identified abnormal out-of-tolerance discrepancies are tagged in step S9 to alert a system operator.

While the present invention has been disclosed as generating a succession of composite image frames for sample analysis, it will be appreciated that adequate analysis information may be available in a single composite image frame constructed from image light at a mere two wavelengths respectively recorded in a single pair of image frames or interlaced pair of image fields. In either case, the volume of image data to be processed is dramatically reduced to a level that can be readily handled by an inexpensive personal computer. It will be appreciated that improved sensitivity is achieved when the selected wavelengths have appropriate extinction coefficients with regard to the sample characteristic of interest to produce an optimum amount of image light incident in the detector array 22. Moreover, by virtue of the present invention, spectroscopic analysis results are available in real time, which is extremely advantageous in applications such as aerial mapping of landscapes, plant species, plant stress, geological features, etc.

It will be apparent to those skilled in the art that various modifications and variations can be made in the apparatus of the present invention without departing from the spirit or scope of he invention. Thus it is intended that the present invention cover the modifications and variations of this invention provided they come within the scope of the appended claims and their equivalents.

What is claimed is:

1. A spectroscopic imaging system for analyzing a test sample, the system comprising, in combination:

input optics for receiving and focusing image light from said test sample;

an optical filter for receiving and filtering said focused image light to thereby pass a plane image, said optical filter capable of being selectively tuned to either a single passband wavelength or to multiple passband wavelengths simultaneously, where said filter is alternately tuned to alternately pass a plane image comprising at least a single passband wavelength and a plane image comprising multiple passband wavelengths;

a planar optical detector array for receiving said plane image; and an image processor connected to the optical detector for receiving first and second image data from said optical detector, said first image data representing said plane image when said optical filter is tuned to said at least a single passband wavelength and said second image data representing said plane image when said optical filter is tuned to said multiple passband wavelengths simultaneously, and for processing said first and second image data to thereby generate a composite plane image permitting real time analysis of the test sample.

2. The spectroscopic imaging system defined in claim 1, wherein the optical filter is an acousto-optic tunable filter, the system further including an RF generator connected to tune the acousto-optic tunable filter to the first and second passband wavelengths.

3. The spectroscopic imaging system defined in claim 1, wherein the optical filter is an acousto-optic tunable filter, the system further including an RF generator connected to tune the acousto-optic tunable filter to the first and second passband wavelengths.

4. The spectroscopic imaging system defined in claim 1, further including output optics positioned between the optical filter and the optical detector to focus the plane image on the optical detector.

5. The spectroscopic imaging system defined in claim 1, further including a display for displaying the composite plane image in real time.

6. The spectroscopic imaging system defined in claim 1 wherein the optical detector includes a planar array of pixels for producing first pixel data in response to said first image data and second pixel data in response to said second image data, and the image processor including means for combining, on a corresponding pixel-by-pixel bases, the first and second pixel data to produce composite pixel data, the system further including a display for displaying the composite pixel data as the composite plane image in enhanced contrast.

7. The spectroscopic imaging system defined in claim 6, wherein the combining means performs a mathematical subtraction operation.

8. The spectroscopic imaging system defined in claim 6, wherein the combining means performs a mathematical ratioing operation.

9. A method for performing spectroscopic analysis of a test sample comprising the steps of:

focusing image light from a test sample on an optical filter;

successively tuning said optical filter to at least a single passband wavelength and to multiple passband wavelengths simultaneously;

optically detecting and storing the plane image; and receiving first and second image data of the plane image, said first image data representing said plane image when said optical filter is tuned to said at least a single passband wavelength and said second image data representing said plane image when said optical filter is tuned to said multiple passband wavelengths simultaneously;

processing the first and second image data to construct a composite plane image permitting real time analysis of the test sample.

10. The method defined in claim 9 further including the step of displaying the composite plane image in real time.

11. The method defined in claim 9, wherein the processing step includes the step of generating composite image data by combining said first image data with said second image data, the method further including the step of displaying the composite image data as a composite plane image of the test sample in enhanced contrast.

12. The method defined in claim 11, wherein the generating step generates the composite image data by combining the first and second image data in a mathematical subtraction operation.

13. The method defined in claim 12, wherein the generating step generates the composite image data from absolute values of results of the mathematical subtraction operation.

14. The method defined in claim 11, wherein the generating step combines the first and second image data in a mathematical subtraction operation to obtain subtraction data and applies a thresholding function to the subtraction data to obtain the composite image data.

15. The method defined in claim 11, wherein the generating step combines the first and second image data in a mathematical ratio operation to obtain the composite image data.

16. The method defined in claim 11, wherein the generating step combines the first and second image data in a mathematical ratio operation to obtain ratio data and applies a thresholding function to the ratio data to obtain the composite image data.

17. The method defined in claim 9, wherein the processing step includes the step of generating composite image data by combining said first image data and said second image data, the method further including the step of comparing the composite image data to standard image data to identify any discrepancies therebetween.

* * * * *